F. OLSON.
GARDEN SEEDER.
APPLICATION FILED JAN. 13, 1915.
1,226,800.
Patented May 22, 1917.
2 SHEETS—SHEET 1.
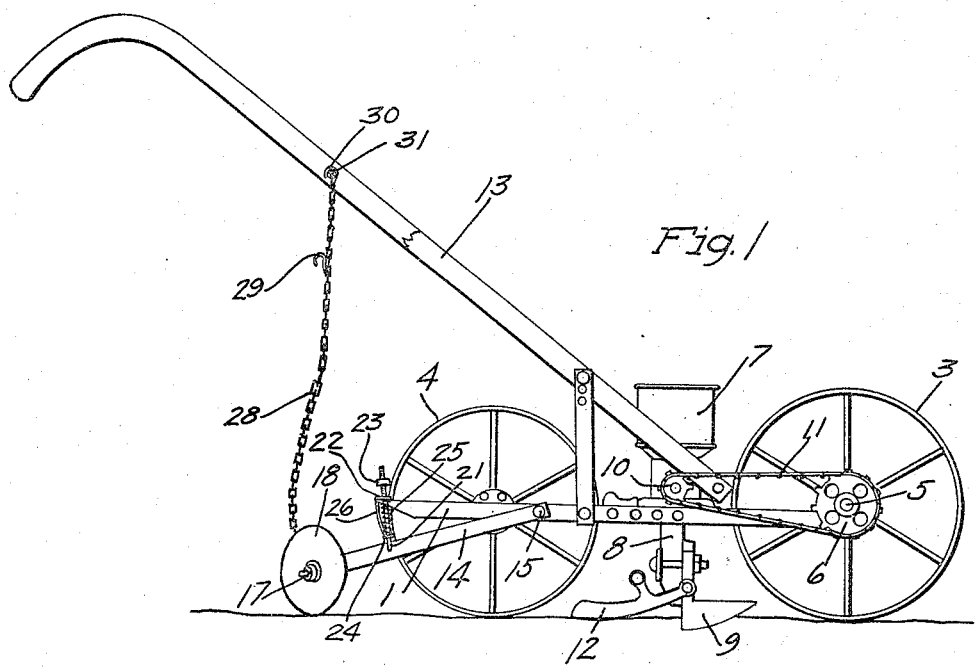
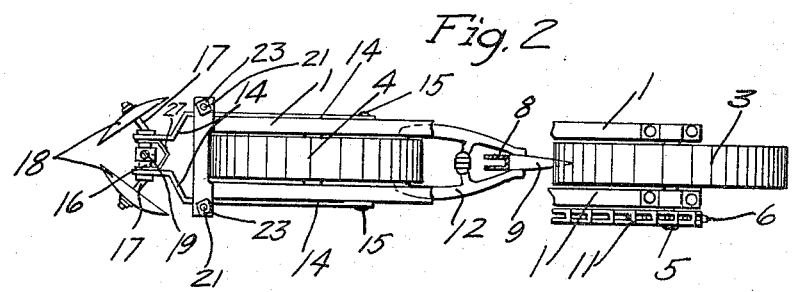
WITNESSES
E. C. Skinkle
A. H. Opsahl
INVENTOR
Fletcher Olson
BY HIS ATTORNEYS
Williamson Merchant

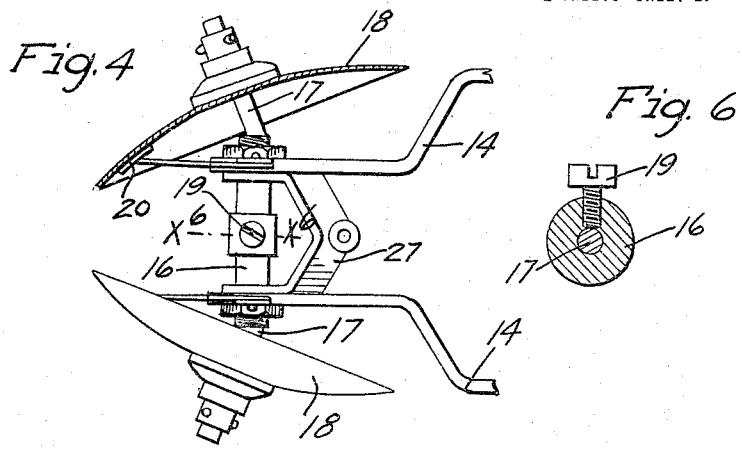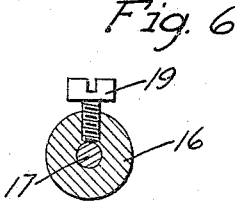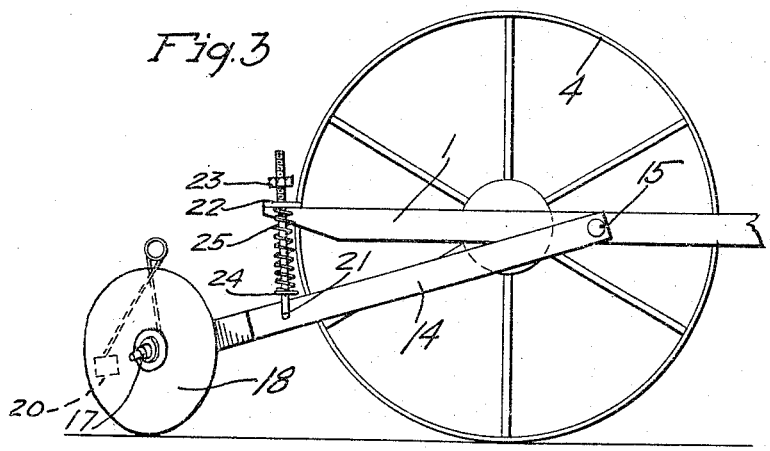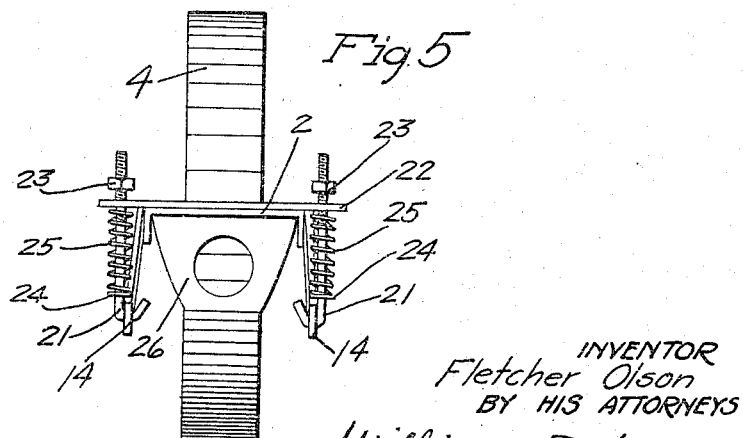

UNITED STATES PATENT OFFICE.

FLETCHER OLSON, OF ROBBINSDALE, MINNESOTA.

GARDEN-SEEDER.

1,226,800.

Specification of Letters Patent.

Patented May 22, 1917.

Application filed January 13, 1915. Serial No. 1,941.

*To all whom it may concern:*

Be it known that I, FLETCHER OLSON, a citizen of the United States, residing at Robbinsdale, in the county of Hennepin and State of Minnesota, have invented certain new and useful Improvements in Garden-Seeders; and I do hereby declare the following to be a full, clear, and exact description of the invention, such as will enable others skilled in the art to which it appertains to make and use the same.

My invention relates to seeding machines, and particularly, to garden seeders having rearwardly extended handle bars, by means of which the seeders are pushed over the ground, and has for its object to provide an improved attachment therefor, whereby the seeds which have been first covered and packed, will be further covered over by a loosely formed ridge of dirt. To the above ends, the invention consists of the novel devices and combinations of devices hereinafter described and defined in the claims.

In the accompanying drawings which illustrate the invention, like characters indicate like parts throughout the several views.

Referring to the drawings:

Figure 1 is a view in side elevation with some parts broken away, showing my improved attachment applied to a garden seeder of the type wherein one wheel is arranged ahead of the other and the seeding device is located between the wheels;

Fig. 2 is a plan view of the seeder shown in Fig. 1, with some parts broken away;

Fig. 3 is a view in side elevation showing the rear portion of the seeder frame, the rear wheel and my improved attachment applied thereto;

Fig. 4 is a plan view of the attachment with some parts broken away and some parts sectioned;

Fig. 5 is a rear elevation of the parts shown in Fig. 3; and

Fig. 6 is a detail in section taken on the line $x^6\ x^6$ on Fig. 4.

Of the parts of the seeder, the numeral 1 indicates the frame work made up of laterally spaced bars and suitable cross ties, the rearmost of which cross ties is indicated by the numeral 2. The numeral 3 indicates the front or traction wheel, and the numeral 4 the rear or packing wheel, both of which wheels are suitably journaled to the framework 1, and the former of which is rigidly secured to a short shaft or axle 5, which, at one end, is equipped with a driving sprocket 6. Secured to the framework 1 between the two wheels 3 and 4, is a seeding device comprising a hopper 7, a depending discharge spout 8 and a furrow forming shoe 9. This seeding device is of well known construction, but it may be noted that the seed delivery wheel, not shown, is provided with a projecting shaft that is equipped with a sprocket 10 over which, and the driving sprocket 6, runs a sprocket chain 11 that serves to operate the feed delivery mechanism. Attached to the lower portion of the spout 8 and projecting rearward therefrom, are covering blades 12 which serve to cover with earth the seeds deposited from the spout 8 into the furrow formed by the shoe 9. The push bars or handle bars 13 are attached to the frame 1 at their front ends, and projected rearward in position to be engaged and used to push the seeder forward.

In the application of my attachment, I pivotally connect the front ends of a pair of laterally spaced bars 14 to the frame bars 1 at 15, and to the rear end portions of the said bars 14, I rigidly secure a bearing and spacing sleeve 16. Extended through the sleeve 16 is an axle 17 that is provided outward of the bars 14 with diverging crank axles on which are journaled ridge-forming disks 18 that are preferably concavo-convex. A set screw 19 seated in the nonrotary sleeve 16 and impinging on the axle 17, serves to hold the said crank axle in different adjustments. The numeral 20 indicates scrapers shown as applied to the rear ends of the bars 14 and arranged to clean the inner or concave surfaces of the disks 18.

The numeral 21 indicates stopper rods shown as hooked through perforations in the bars 14 and passed upward through perforations in the projected ends of a cross bar 22, which latter, as shown, is rigidly secured on the cross bar 2. The upper ends of the rods 21 are threaded and provided with nuts 23 that engage the ends of the bar 22 to limit the downward movements of the disks 18. Surrounding the rods 21 and compressed between the ends of the bar 22 and collars 24 on the said rods, are springs 25 which exert a force tending to throw the disks downward into the ground, as far as permitted by the rods 21 and nuts 23. The numeral 26 indicates a scraper applied to the bar 2 and arranged to clean the peripheral face of the rear or packing wheel 4.

The numeral 27 indicates a yoke which is pivoted on the sleeve 16, and to the intermediate portion of which the lower end of a lifting chain 28 is attached. This chain 28, at its upper end, is provided with hooks 29 and 30, which are adapted to be hooked onto a cross rod 31, the ends of which are secured to the push bars 13. When the hook 30 is applied to the rod 31, the disks 28 will be free to move down into the ground as far as permitted by the rods 21 and nuts 23, but when the hook 29 is applied to the said rod 31, the said disks will be held raised above the ground, and hence, in inoperative positions.

By rotary adjustments of the crank axle 18, also, the width of the loose ridge of dirt that will be formed over the packed furrow may be varied, because, as is evident, this angular adjustment of the said axle will serve to raise and lower the points of the nearest approach between the converging edges of the coöperating disks 18.

When the machine is pushed forward, the furrow to receive the seed will be formed by the shoe 9, the deposited seed will be primarily covered by the covering blades 12, and this loose covering of dirt will be packed by the wheel 4. This much is the usual operation. It is a well known fact that dirt tightly packed at its surface, exposed to the atmosphere, will dry out much more rapidly than loose dirt covering. So-called dry farming, relies to a very great extent simply on loose dirt coverings to prevent evaporation of the moisture from the soil. With my improved attachment, the disks 18 which follow behind the packing wheel 4, scrape up and throw a loose ridge or covering of dirt over the packed track or surface made by the said rear or packing wheel 4, and in this way, without any additional work, the desired loose surface covering is afforded. Furthermore, the ridges thus formed over the planted seeds will be more accessible to harrowing. Under the harrowing operation, the tops of the ridges will be leveled off more or less and the loose earth more generally distributed over the surface.

The attachment may be very easily applied to garden seeders already in general use, as well as to new seeders, and its use very greatly increases the efficiency of the implement.

What I claim is:

1. In a seeding machine, the combination with a furrow former, of a seeding device delivering at the rear of said furrow former, a covering device working at the rear of said seeding device, a packing wheel working at the rear of said covering device, and an auxiliary covering device working directly at the rear of said wheel and serving to deposit a loose ridge of dirt on top of the packed surface formed by the said wheel.

2. In a seeding machine, the combination with two wheels located, one ahead of the other, of a furrow forming shoe immediately at the rear of said front wheel, a seeding device delivering at the rear of said shoe, a covering device at the rear of said seeding device but in front of the rear wheel, and an auxiliary covering device working immediately at the rear of said rear wheel and serving to deposit a loose ridge of dirt on top of the packed surface formed by the said rear wheel.

In testimony whereof I affix my signature in presence of two witnesses.

FLETCHER OLSON.

Witnesses:
 HARRY D. KILGORE,
 F. D. MERCHANT.

Copies of this patent may be obtained for five cents each, by addressing the "Commissioner of Patents, Washington, D. C."